US006901512B2

(12) United States Patent
Kurn et al.

(10) Patent No.: US 6,901,512 B2
(45) Date of Patent: May 31, 2005

(54) CENTRALIZED CRYPTOGRAPHIC KEY ADMINISTRATION SCHEME FOR ENABLING SECURE CONTEXT-FREE APPLICATION OPERATION

(75) Inventors: David Michael Kurn, Mountain View, CA (US); Kent Adams Salmond, Los Gatos, CA (US); Robert A. Panero, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 09/736,715

(22) Filed: Dec. 12, 2000

(65) Prior Publication Data

US 2002/0073309 A1 Jun. 13, 2002

(51) Int. Cl.$^7$ ................................................. H04L 9/00
(52) U.S. Cl. ........................ 713/164; 713/168; 380/277
(58) Field of Search ........................ 713/155, 164–168, 713/189, 193, 173; 707/1, 9, 10; 380/286, 277–280, 259

(56) References Cited

U.S. PATENT DOCUMENTS

| 4,405,829 | A |  | 9/1983 | Rivest ...................... 178/22.11 |
|---|---|---|---|---|
| 5,963,646 | A | * | 10/1999 | Fielder et al. .............. 380/259 |
| 6,067,623 | A | * | 5/2000 | Blakley et al. ............. 713/201 |
| 6,105,012 | A | * | 8/2000 | Chang et al. ................. 705/64 |

OTHER PUBLICATIONS

Smith, Richard. Internet Cryptography, 1997 Addison Wesley Longman, Inc.*
Microsoft Corporation, "Microsoft Authenticode™ Technology: Ensuring Accountability and Authenticity for Software Components on the Internet", Oct. 1996, http://www.msdn.microsoft.com/workshop/security/authcode/authwp.asp.

Rivest et al., "On Digital Signatures and Public–Key Cryptosystems", Massachussettes Institute of Technology, Lab. for Computer Science, Apr. 1977, MIT/LCS/TM–82.

Rivest et al., "A Method for Obtaining Digital Signatures and Public–Key Cryptosystems", Massachussettes Institute of Technology, Lab. for Computer Science and Department of Mathematics, Feb. 1978, Communications of the ACM, vol. 21, No. 2.

S.C. Kothari, "Generalized Linear Threshold Scheme", Lecture Notes in Computer Science, Iowa State University, Dep. of Computer Science, 1985, Library of Congress Catalogue ISBN 0–387–15658–5 (U.S.).

A. Menezes et al. "Handbook of Applied Cryptography", 1997 by CRC Press, Library of Congress Card No. 96–27609, ISBN 0–8493–8523–7, Table of Contents pp iv–xxviii, Chapters 1, 8, 12.4 and 13 (pp. 1–48, 283–319, 505–516 and 543–590).

* cited by examiner

Primary Examiner—Emmanuel L. Moise
Assistant Examiner—Christopher Revak

(57) ABSTRACT

In scalable multi-node systems, applications that interact with remote users often use sessions that involve multiple messages. Unless the application instance that initiates the conversation processes all subsequent parts of that session, the context of the conversation must be passed between application instances. This context often involves sensitive data, such as session keys. This invention uses a central service, known as a Key Repository process, to create and manage a set of symmetric encryption keys unique to this application. All authorized instances of the application then obtain these keys from the Key Repository process, enabling these application instances to encrypt and save the context on disk, and allowing a possibly different instance of the application to retrieve and decrypt the context. As a result, these application programs can be designed to operate in a context-free manner.

18 Claims, 6 Drawing Sheets

CENTRALIZED CRYPTOGRAPHIC KEY ADMINISTRATION SCHEME FOR ENABLING SECURE CONTEXT-FREE APPLICATION OPERATION

RELATED APPLICATIONS

This application is related to and incorporates herein by reference U.S. Applications entitled as Follows:

"Scalable Computer System Using Password-Based Private Key Encryption," Ser. No. 09/734,962, Filed Dec. 11, 2000;

"Method And Apparatus For Enforcing The Separation Of Computer Operations And Business Management Roles In A Cryptographic System," Ser. No. 09/736,718, Filed Dec. 12, 2000;

"Software Process Pre-Authorization Scheme For Applications On A Computer System," Ser. No. 09/735,088, Filed Dec. 11, 2000;

"Multiple Cryptographic Key Linking Scheme On A Computer System," Ser. No. 09/735,087, Filed Dec. 11, 2000;

"Scalable Computer System Using Remote Agents To Manipulate Cryptographic Keys," Ser. No. 09/736,688, Filed Dec. 12, 2000;

"Method And Apparatus For Cryptographic Key Rollover During Operation," Ser. No. 09/736,717, Filed Dec. 12, 2000;

"Computer System Having An Autonomous Process For Centralized Cryptographic Key a Administration," Ser. No. 09/736,650, Filed Dec. 12, 2000; and "Computer System Employing A Split-Secret Cryptographic Key Linked To A Password-Based Cryptographic Key Security Scheme," Ser. No. 09/735,215, Filed Dec. 11, 2000.

BACKGROUND OF THE INVENTION

1. Field of the Invention

The present invention is related to computer security. More specifically, the present invention is related to cryptographic systems on computer servers.

2. Description of the Related Art

E-Commerce

The advent of the Internet has spawned a new means for conducting business. Commerce that is conducted online, such as via the Internet or virtual private networks, is called e-commerce. E-commerce mimics many of the steps of regular commerce. However, because of the nature of cyberspace, the parties may never have met and may never meet. To accommodate business transactions where the parties never meet or know each other, various schemes have been devised to ensure secure and verifiable business transactions.

The security of the e-commerce transaction is accomplished through encryption schemes. The authenticity and other necessary aspects of commerce are handled through trust relationships. Often, these trust relationships are implemented through trusted third parties and are erected as part of the online business infrastructure.

Computing systems evolved away from mainframe computers in the 1960's and 1970's to a distributed environment consisting mainly of personal computers in the 1980's and early 1990's. However, with the advent of the Internet, powerful servers (descendants of the old mainframe computers) have regained their former importance. Internet-connected servers now run software applications for client systems and perform business-to-business transactions and business-to-consumer transactions. In many cases, these transactions include sensitive information, which must be protected against unwanted exposure (privacy) or modification (integrity), or both. In some cases, there's a requirement that there be strong evidence of an event having taken place (non-repudiation), to further the resolution of disputes. People working in the field of cryptography have developed various schemes and methods have to provide such facilities. One of the crucial infrastructures of online business is trust. A trust relationship can be erected using computer servers (and clients) that are equipped with software encryption applications.

A typical prior art public key encryption scheme is the RSA scheme, which is described in U.S. Pat. No. 4,405,829 to Rivest et al; R. L. Rivest, A. Shamir, and L. M. Adleman, "A Method for Obtaining Digital Signatures and Public-Key Cryptosystems," Communications of the ACM, v. 21, n. 2, February 1978, pp. 120–126; "R. L. Rivest, A. Shamir, and L. M. Adleman, "On Digital Signatures and Public Key Cryptosystems," MIT Laboratory for Computer Science, Technical Report, MIT/LCS/TR-212, January, 1979. The RSA scheme is used both for encryption and digital signatures. The RSA scheme is often combined with other technologies to provide privacy, integrity, and non-repudiation. Cryptographic systems, and the terminology used in the discipline, are described in "Applied Cryptograpy" by Bruce Schneier (John Wiley & Sons, Inc., New York, 1996).

RSA Scheme

According to Bruce Schneier, "RSA gets its security from the difficulty of factoring large numbers. The public and private keys are functions of a pair of large prime numbers (100 to 200 digits or even larger). Recovering the plaintext from the public key and the ciphertext conjectured to be equivalent to factoring the product of the two primes." Bruce Schneier, "Applied Cryptography" Second Edition, John Wiley & Sons, Inc., New York, 1996, pp. 467.

Under the RSA scheme, to generate the two keys, one chooses two random large prime numbers, p and q. For maximum security, one chooses both p and q to be equal in length. Next, one computes the product:

$$n=pq$$

Then randomly choose the encryption key, e, such that e and $(p-1)(q-1)$ are relatively prime. Finally, one uses the extended Euclidean algorithm to compute the decryption key, d, such that $$ed=1 mod(p-1)(q-1))$$

or, upon solving for the decryption key d, $$ed=e^{-1}mod\ (p-1)(q-1))$$

From the equations, it is clear that both d and n are relatively prime. The numbers e and n are the public key; the number d is the private key. The two primes, p and q are no longer needed and are discarded immediately—never to be disclosed or revealed.

Again, referring to Schneier, to encrypt a message, you first divide the message into numerical blocks smaller than n (with binary data, one simply chooses the largest power of 2 less than n). For example, if both p and q are 100-digit primes, then n will have just under 200 digits and each message block, mi, should be just under 200 digits long. The encrypted message, c, will be made up of similarly sized message blocks, $c_i$, of about the same length. The encryption formula is simply:

$$c_i = m_i^e \bmod n$$

To decrypt a message, one takes each encrypted block, $c_i$, and computes:

$$m_i = c_i^d \bmod n$$

Bloom-Shamir

There is another prior-art scheme that deals with the problem of splitting a secret into several components so that no one individual or group of individuals can produce the secret unless the required number of components are available. Often called an M-out-of-N scheme, it allows the customer to reduce the risk of malfeasance by requiring that M out of N (where M is one or more but less than N) people all agree to certain acts. One such M-out-of-N implementing algorithm is the Bloom-Shamir algorithm that is defined in "Generalized Linear Threshold Scheme" by S.C. Kothari, (Proceedings of CRYPTO 84). See also: S. C. Kothari, "Generalized Linear Threshold Scheme," in Advances in Cryptology—CRYPTO '84", G. R. Blakley and D. Chaum, eds.; and Lecture Notes in Computer Science volume 196 (1985), pages 231–241.

Software tools are available for implementing cryptographic schemes into software applications and user-interfaces. One such tool kit is called "BSAFE" and is produced by RSA Security of Bedford, Mass. Information regarding BSAFE and other products, and about public key infrastructure, is available at the RSA web site at http://www.rsasecurity.com/.

Public Key Cryptographic Standards (PKCS)

Widely used methods of performing cryptographic operations are described in the Public Key Cryptographic Standards (PKCS), a set of standards for public-key cryptography developed by RSA Laboratories [PKCS]. The present invention makes use of:

PKCS#1—a mechanism for encrypting and signing data; and

PKCS#5—password-based cryptography method.

Authenticode

The Microsoft Corporation of Redmond, Wash., developed a technology in 1996 that enables users of the Internet's World Wide Web to download binary code (libraries and programs) in a manner that ensures the authenticity of the code. This technology has been dubbed "Authenticode" and is the subject of a white paper published by Microsoft in 1996 entitled "Microsoft Authenticode Technology, Ensuring Accountability and Authenticity for Software Components on the Internet." The document is available via the Internet at: http://msdn.microsoft.com/workshop/security/authcode/authwp.asp and is herein incorporated by reference.

According to the white paper,

" . . . [u]sing Microsoft Authenticode technology, end users can be assured of accountability and authenticity for software components they download over the Internet. Authenticode alerts users before Web sites download executable files to their computers. If code is signed, Authenticode presents the certificate so the user knows that the code hasn't been tampered with and so the user can see the code's publisher and the certificate authority. Based on their experience with and trust in the software publisher, users can decide what code to download on a case-by-case basis."

"Digital certificates are issued by independent certificate authorities such as VeriSign to commercial and individual software publishers. The certificate authority verifies the identity of each person or company registering, assuring that those who sign their code can be held accountable for what they publish. After successfully completing the verification process, the certificate authority issues the software publishing certificate to the publisher, who then signs its code before shipping an application."

"Users benefit from this software accountability because they know who published the software and that the code hasn't been tampered with. In the extreme and remote case that software performs unacceptable or malicious activity on their computers, they can also pursue recourse against the publisher. This accountability and potential recourse serve as a strong deterrent to the distribution of harmful code."

"Developers and Webmasters benefit tremendously from Authenticode as well. By signing their code, developers build a trusted relationship with users, who can learn to confidently download software from that publisher or Web site. Moreover, end users can make educated decisions about what software to download, knowing who published the software and that it hasn't been tampered with." Authenticode white paper, page 1.

The Operational Paradigms

The growth of e-commerce requires that end-users be assured that their transactions are private, unmodified, and provable. The cryptographic techniques described above are often used to provide these attributes. In such a transaction, it is important to note the role of the originator of the transaction in exercising independent will to do the transaction. In the workstation paradigm, it is possible to follow the steps of a transaction from the originator's perspective as follows, assuming that the originator is using, for example, a personal computer or terminal:

The originator decides what is to be done. This is the act of independent will, and will most often by done by a live person. Using the computer, the originator supplies the necessary information defining the nature of the transaction. This could be something like "Please transfer $100.00 from my checking account to my savings account." How this is done is not really important. The originator instructs the computer to sign and encrypt the data. The encryption step will ensure the privacy of the information as it flows from the computer to its destination (perhaps a bank). The digital signature will provide integrity and dissuade repudiation. The digital signature is evidence that the originator did create the event and that the event actually happened. This is useful in case the recipient of the request wants to prove that the originator requested it rather than some impersonator.

Signing the data requires that the computer have access to the private keys (cryptographic secrets) of the originator. Encrypting the data requires that the computer have access to the public key of the intended recipient, and the authenticity of that key can be proven provided the computer program has access to a trust root. The computer will ask for a secret that known only to the originator, such as a password, which will unlock the private keys and trust roots, and allow the signing and encryption to go forward. After the data has been signed and encrypted, the computer will erase the secret keys and passwords to reduce the risk of their being used again without obtaining the originator's active consent. It is important to note, in the above sequence of steps, that the originator was personally involved in the process, and only with consent did the digital signing occur.

Unlike the above workstation situation, servers usually need access to keys all the time. Whereas the originator was present to provide needed passwords, servers are often unattended. Similarly, in the workstation paradigm, a small number of events are occurring concurrently. However, in the server paradigm, large numbers of concurrent events are occurring, each of which may require the use of secret information.

In the workstation paradigm, the originator is involved in credential renewal, comparable to renewing one's driver's license. In the server paradigm, one cannot suspend business operations while new keys are issued.

Additionally, the need to protect keys against exposure can be different. In a workstation environment, exposure of keys could cause problems with the originator's resources, but the damage would be confined to this one person, and the cost of that damage contained. On the other hand, in a server, compromise of the keys could jeopardize all the users and their accounts. For example, one is generally willing to spend more effort protecting a bank's resources than one is willing to spend to protect an individual's resources.

In the past, the problem of the server environment has been addressed by a variety of efforts. Application designers are faced with a dilemma of how to protect these secrets (typically cryptographic keys). Storing them in a text file, or within a program, or even in an independent box, is an open invitation to fraud. Text files can be copied and examined easily by most anyone with access to the computer (in fact, really protecting a file system is difficult). Keys stored in programs can make the program files themselves a valuable target of fraud. Keys stored in independent boxes become vulnerable because it is difficult to control which programs or which agents access the box.

Furthermore, relying upon firewalls helps protect the secrets against external attack, but leaves unguarded fraud from corruptible employees. Traditional banking practice requires multiple individuals to perform certain tasks, such as opening a vault. To enforce this requirement, separate keys are entrusted to separate trusted officers, although requiring both keys to unlock the vault.

The prior art public key infrastructure (PKI) schemes are built upon a "workstation paradigm." The workstation paradigm has an individual user, at a given workstation, that utilizes encryption technology on the workstation to send encrypted messages to another person, or themselves at another workstation. In the workstation paradigm, servers are used only as transport mechanisms. The advent of the worldwide web of the Internet has eroded many of the underlying assumptions of the workstation paradigm. Unfortunately, the prior art PKI schemes have not kept pace. There is, therefore, a need for a crypto-system that allows multiple simultaneous users having multiple sessions while preserving security and integrity of both keys, signatures, access rights, and an apparatus and method to enable automated trust relationships on computer server for multiple applications and multiple users.

SUMMARY OF THE INVENTION

The present invention provides a paradigm shift from the workstation-centric cryptographic system to a server-centric cryptographic system. The present invention provides a framework from which context-free applications (both server and client) can work in an autonomous, scalable, fault-tolerant, and secure manner.

The Key Repository process of the present invention addresses the management of trust between processes, whether they are instantiated on the server or on the client device. The Key Repository process is the only program in the computer system that knows the critical secrets. The Key Repository process will supply selected keying material to pre-authorized applications, thus limiting the spread of the secret information, and eliminating the need for human intervention after system startup. The Key Repository process enforces policy decisions in such areas as identifying authorized applications, changes in parameters, and does so by requiring multiple approvals before changes are implemented.

The present invention provides a context storage mechanism that is superior to the prior art methods of either storing the context-related information in the working memory of the server (by the server process), or having the client store the context-related information in the form of cookies. Instead, the present invention employs a database that resides on the server and that works in conjunction with the Key Repository process. It is through the use of the Key Repository process (to issue and manage the symmetric keys that are used to encrypt the transaction between the server process and the application) and the use of the database (to store the symmetric keys and other context-related information) that enables any client application to work with any server process to service the request. The present invention is advantageous in that it is both scalable and fault-tolerant.

The process of the present invention first checks to see if an application is authorized to utilize enterprise credentials. If so, then the application or other server process is instantiated on one or more servers. If one or more symmetric keys are needed to secure (encrypt) the transaction between the user and the application running on the server, then these keys are provided by the Key Repository process. Upon the completion of each transaction, the context sensitive information is stored on the database for retrieval by the same or different application.

Hence, in accordance with the purpose of the invention as embodied and broadly described herein the invention relates to system capable of providing secure context-free multi-part communication. The system can be a cryptographic system with at least one server and any number of clients, including none. The system further includes at least one application on one of the at least one server, each capable of engaging in a context-free multi-part communication session with any of the clients. The system further includes a key repository process on one of the at least one server. Preferably, the key Repository process is a process pair. The key repository process is configured to maintain and pre-authorize access to one or more than one set of symmetric keys, wherein each of the at least one application is configured to query the key repository process for permission to access and retrieve the one or more than one set of symmetric keys. The key repository process is further configured, in response to the query from a particular one of the at least one application, to authenticates the particular one of the at least one application as being pre-authorized and, if so, provide the one or more than one set of symmetric keys to the particular one of the at least one application. The particular one of the at least one application can utilize the one or more than one set of symmetric keys for securely offloading sensitive information in any intermediate part of the context-free multi-part communication session.

The sensitive information in an intermediate part is securely off-loaded, in encrypted form, either to a database or as a cookie to a particular client, wherein the particular client returns the cookie within the next part of the context-free multi-part communication. What is more, the securely off-loaded sensitive information can be then accessed by any one of the at least one application engaging in the context-free multi-part communication session.

In further accordance with the purpose of the invention as embodied and broadly described herein the invention is also related to a method for secure context-free multi-part communication in a computer system with a server and any number of clients, including none. The method includes steps analogous to the functions performed in the above-described system.

DETAILED DESCRIPTION OF THE INVENTION

The present invention solves the problems inherent in the prior art by providing an apparatus and method for mimicking the human login process for specific and individual processes on a server-based computer system. Although the present invention may be deployed on a wide variety of computer architectures, in its best mode, the present invention is used on high-availability servers, such as the Non-Stop® Himalaya server systems produced by the Compaq Computer Corporation of Houston, Tex.

The method and apparatus of the present invention enable end entities to conduct commerce over unprotected networks (such as the Internet) in a secure fashion. In cryptographic parlance, an end entity is a person, router, server, software process, or other entity that uses a digital certificate to identify itself. In the context of the present invention, the definition of "consumer" includes any end entity. However, the definition of "consumer" for the present invention is broader in that it can include both people and organizations (both de facto and de jure). "Consumer" is, interchangeably, also referred to herein as a "client." In this sense, the consumer of the present invention can be an individual (with or without their own digital certificate) sitting at home trying to access their bank accounts. It can also be a business enterprise that has an automated software agent purchasing products based upon some pre-defined criteria. It will be apparent to those skilled in the art that the consumer of the present invention can be a wide variety of entities (real, legal, and abstract).

The term "enterprise," in the context of the present invention, has essentially the same definition of "consumer." A separate term is used in order to illustrate more clearly the two sides of a transaction using the present invention. In practice, however, a consumer is typically a person or small business organization. An enterprise can be a business organization of any size. While this is not necessarily always the case, for purposes of the following illustration, a consumer can be thought of as an individual person and an enterprise can be thought of as a business organization even if owned/operated by one person.

The Processes of the Present Invention

Figure 1:
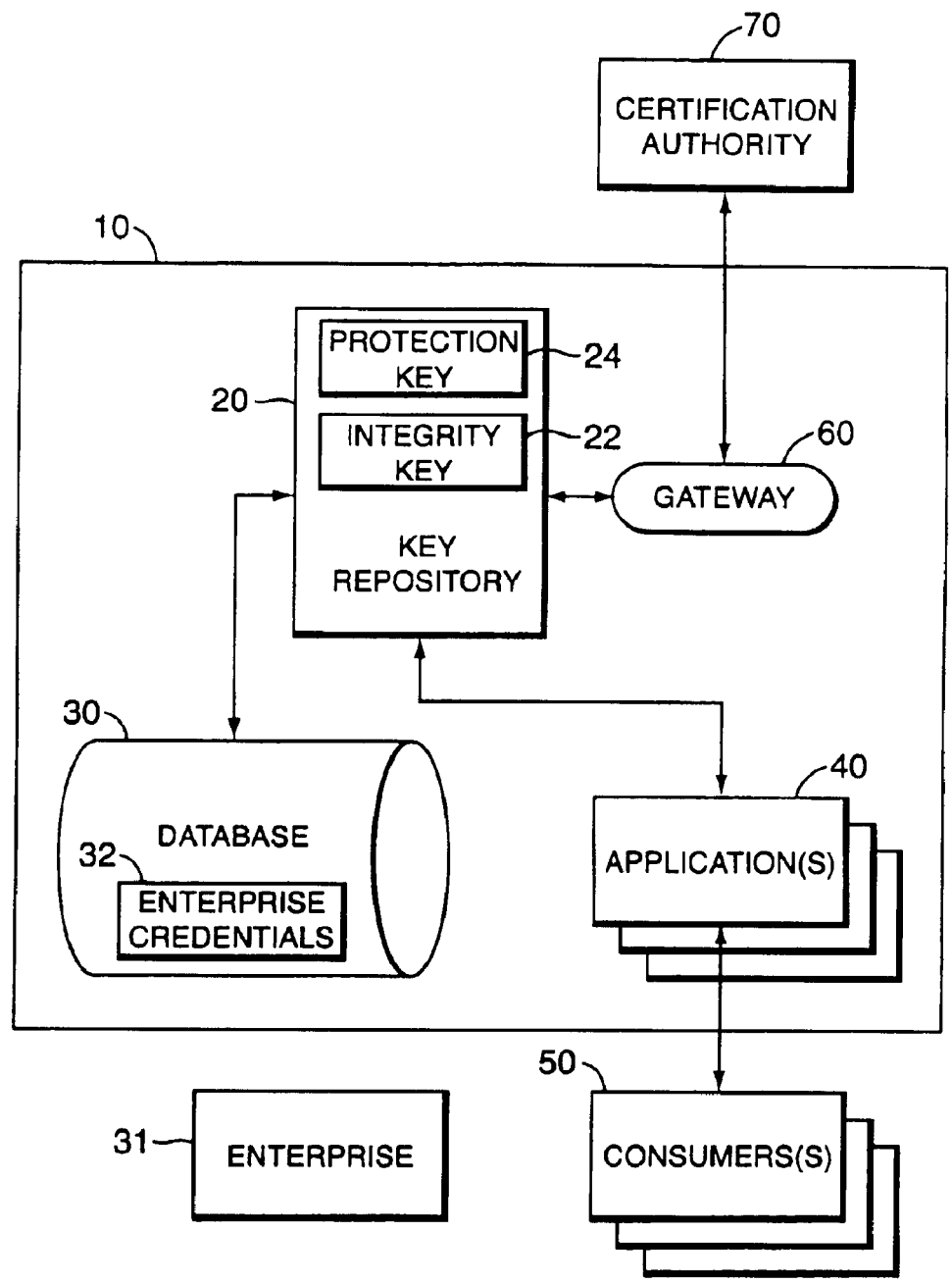
FIG. 1 is a block diagram of the processes of the present invention.

The basic architecture of the present invention includes several components as shown in FIG. 1. The computer system 10 can be composed of one or more computer servers or other computing devices. The only requirement of the server or device is that it be able to run one or more of the processes of the present invention. If only one server is used, it must be capable of executing all of the processes of the present invention. Otherwise, if multiple servers are used, then the processes may be "farmed out" or instantiated on separate servers that are connected to a common network. In an embodiment of the present invention, it is assumed that the transmissions between the servers of the computer system 10 can be made in a secure manner. The common network mentioned above is not intended to be something like the Internet, unless extra transmission-related security measures (such as SSL (Secure Socket Layer), SSH (Secure Shell) or IPSec (Internet Protocol Security), etc.) are invoked.

The present invention uses cryptographic keys to manage confidential information on a database. Two keys form a set of master keys in the present invention. Each of the two master keys performs a specific function within the cryptographic scheme of the present invention. One of the keys is configured within a Key Repository process to maintain the integrity of critical information on the database. The other master key is used within the Key Repository process to protect the confidential information on the database.

An alternate embodiment of the present invention can utilize one master key in the Key Repository process. This single master key would be used both for integrity of the critical information on the database as well as to protect the confidential information. However, use of a single key may give the user pause to let operators have access to a complete key. Therefore, a single master key may require reformulation of the administrative procedures for the generation and use of the single master key.

According to FIG. 1, the Key Repository process 20 is a process that runs on the computer system 10. The Key Repository process 20 makes use of a database 30 to save necessary information. Included on this database 30 are one or more entries defining Operators, and two or more entries defining Owners. The Operator entries are used to retain the value of the Integrity Key 22. The Integrity Key 22 is configured to ensure the integrity of sensitive information within the database 30. The Owner entries are used to retain a share (described below) of the Protection Key 24. The Protection Key 24 is configured to protect sensitive information on the database 30. In both cases, the entries protect their respective secret by a password-based public-key encryption method described below. Finally, database 30 also stores the enterprise credentials 32 of the enterprise 31 that sponsors the application 40. In this illustration, the consumer 50 uses the applications 40 to conduct business with the enterprise 31 whose enterprise credentials 32 are retrieved from the database 30, thus allowing applications 40 (representing the enterprise 31) and consumer 50 to conduct business. This business transaction can be two-way in that the application 40 can be the business conduit on behalf of either or both the consumer 50 and the enterprise 31.

Password-Based Public-Key Encryption

When the Operator or Owner is introduced to the system, the process of the present invention first obtains a name and a password from the command interface. Second, the process invents a salt value and a public/private RSA key pair. None of these values are revealed to the individual. The RSA encryption scheme requires the use of two keys, one of which is usually public and is not hidden, the other that is private. For purposes of the present invention, a salt value is a random number whose value is known and saved, but itself has no information encoded in it. A salt value is also sometimes called a nonce.

Third, the Operator's or Owner's password is combined with the salt value to compute a symmetric key and initialization vector, and, using any of a number of symmetric encryption algorithms in cipher block chaining (CBC) mode, the operator's or owner's RSA private key that was invented above, is encrypted. The methodology for this is described by RSA's PKCS #5 (password-based encryption), although the method described by RSA has been extended by allowing the customer to specify which hashing algorithm is used, the hash-iteration count, and the symmetric encryption algorithm. For purposes of this application, a hash (also known as a message digest) is a function that takes input data and produces a short answer (typically 128 or 160 bits in length) with the property that, given the answer, it is unfeasible to construct input data, other than the true data, which will produce the same answer. A hash function is often called a "one-way" function. By repeating a hash function, one increases the amount of time it would take to break the one way function by trial-and-error. Thus, hashes are often repeated thousands of times. In addition, the present invention uses the value of the protection key (one of the master keys) to encrypt the RSA public key. This prevents an undetected modification of the protected secret unless the true RSA public key can be exposed.

The secret, which for Operators is the value of the Integrity Key, and for Owner is their share of the value of the Protection Key, is then encrypted by the RSA public key, using the methodology described by RSA's PKCS#1. The database record for the Owner (or Operator) is then written, and contains:

a) the name of the Operator or Owner;
b) the salt value;
c) the public key of the RSA key pair, encrypted with the protection key;
d) the name of the hashing algorithm used;
e) the number of times the hash value was re-hashed;
f) the name of the symmetric algorithm used;
g) the private key of the RSA key pair (encrypted with password-based encryption); and
h) the secret value encrypted by the RSA key pair.

As implied above, the Protection Key 24 is divided into shares. In an embodiment, the Bloom-Shamir sharing algorithm is used for the division. The number of shares is dictated by the count of Owners known to the system. The order of the algorithm (i.e., the number of shares that will be needed to reconstitute the secret) is dictated by the current value of the Approval Count parameter, which can be any number between one and one less than the number of Operators known to the computer system 10.

Although the system of the present invention initially is activated with an Approval Count of one, customers are advised to change the approval count to a higher number in accordance with their own security policy. For example, a banking institution could require that seven out of fifty individuals be required to recreate the bank's Protection Key 24. The use of seven reduces the fraud-risk, and the availability of fifty candidates increases the chances of locating at least seven. In the present invention, the individuals needed to expose the Integrity Key 22 need not be the same set of individuals needed to re-compute the Protection Key 24.

The crucial information in the database 30 is protected against modification by an Integrity Key 22. The confidential data is protected by the Protection Key 24. When the Key Repository process 20 is restarted, one of the Operators known to the system exposes the Integrity Key 22 by use of the correct identity and password, as described below. The Protection Key 24 is assembled from a set of secrets that are split among multiple individuals, known as Owners, according to the Bloom-Shamir methodology. When the requisite number of Owners have exposed their share of the split Protection Key 24, using the methodology described below, the Protection Key 24 can be recovered.

Operators and Owners

In the present invention, two distinct classes of system operators are needed. Operators are responsible for the overall computing environment. Any operator can start the Key Repository process, and in so doing, asserts that the computer system is indeed what it claims to be. In alternate embodiments of this invention, this assertion is used to unlock and expose a set of cryptographic credentials with which the Key Repository process can communicate in a trusted and secure fashion with resources external to the platform, allowing that resource to be, but not limited to, the following set of functions:

a) A remotely located owner can perform his functions using a secure link; and
b) A remote extension of the Key Repository process (Remote Agent), or a remote Key Repository process can act on behalf of the local Key Repository process and perform those actions which require access local to the application program.

Initial Key Creation

When the Key Repository process 20 is executed for the first time, that is, without a database 30 from a prior run, the person initiating the process provides the program with the following information:

1. the name of the database 30;
2. the name and password for one operator;
3. the name and password for one owner; and
4. the name and password for a second owner.

The Key Repository process 20 defines these individuals in the database 30, as described above, and creates both a Protection Key 24 and an Integrity Key 22, encoding these values in the database 30 as described above. The values of both the Protection Key 24 and the Integrity Key 22 are then erased from the computer memory, and can be reconstituted by an Operator in conjunction with one or more of the Owners by supplying their respective identity and password.

Figure 3:
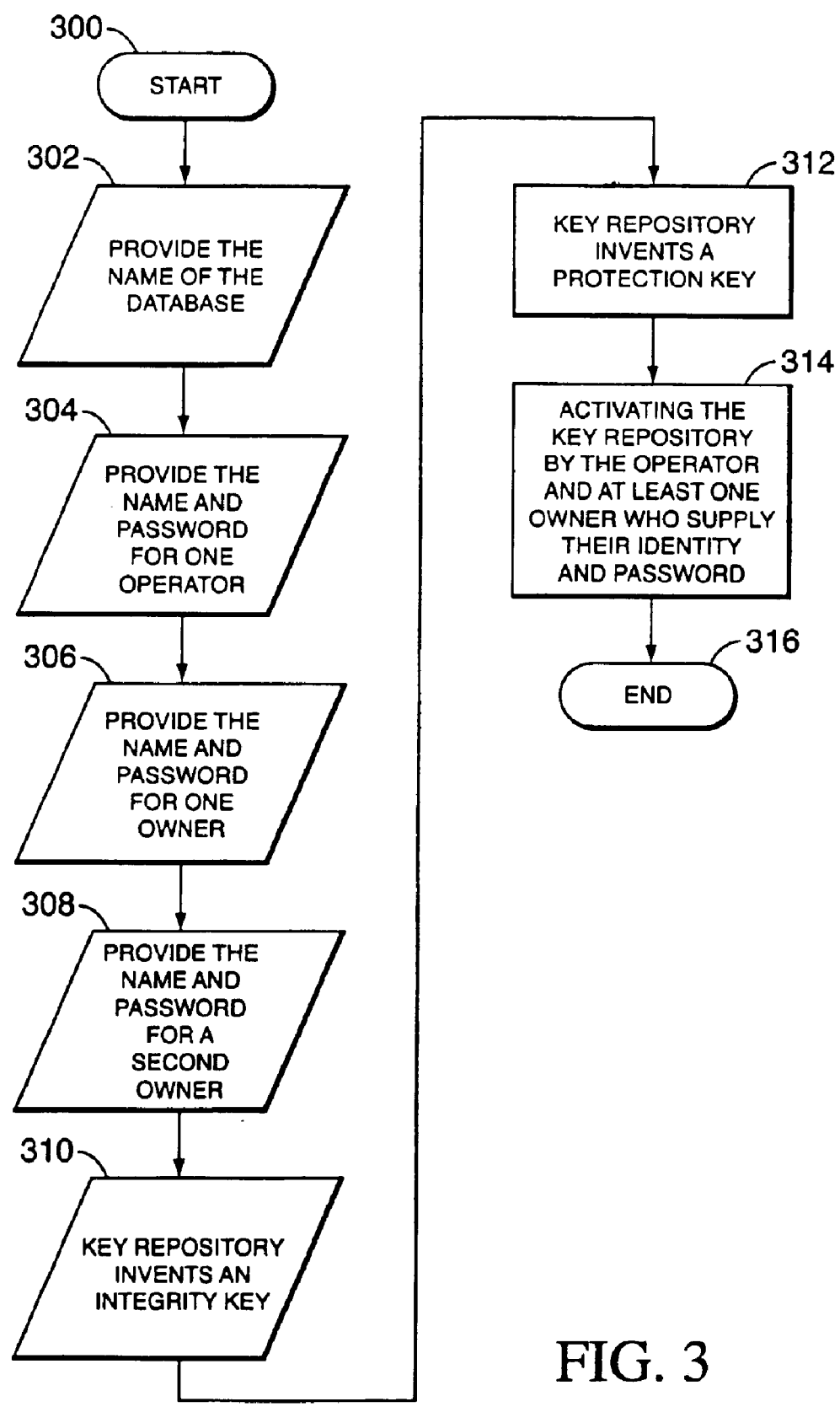
FIG. 3 is a flow chart of the initial key creation method of the present invention.

The method of creating the keys is illustrated in FIG. 3. The method starts with step 300. Thereafter, the name of the database is provided in step 302. The name and password for at least one operator is provided in step 304. The names and passwords of at least two owners are provided in steps 306 and 308. Next, in step 310, the Key Repository process creates an Integrity Key. Thereafter, the Key Repository process creates a Protection Key in step 312. It should be noted that the order of the steps previously discussed is not important except that all of the input information must be provided before all of the keys can be created. For example, after the names and passwords have been entered, either one of the keys can be created. After the keys have been created and recorded on the database using the password-based public-key encryption method defined above, the keys are erased from memory. At this point, the Key Repository process is activated by the Operator, and either (at least one) of the Owners who supply their identity (e.g., their username) and their passwords, step 314. The process then ends in step 316.

At this point, because the initial passwords may not have been well protected, it is recommended practice, and part of an embodiment of the present invention, to require that each operator and owner modify his/her respective password without allowing other individuals to see the keystrokes, and that additional Operators and Owners be added to the list of legitimate operators/owners, as required by the customer's security policy, and that other security parameters (such as the approval count, the algorithm selections) are adjusted, as required by the customer's security policy. All of the above suggestions are, however, optional, and it is within the scope of alternate embodiments of the present invention to not use the elements of the above-recommended practice.

In an embodiment of the present invention, the value of the Integrity Key 22, as well as each value of a share of the Protection Key 24, is stored on the database 30 encrypted using the password-based public-key technique. The Operator or Owner by entering his name allows the Key Repository process 20 to find the relevant record in the database 30. The password supplied by the Operator or Owner is combined with a salt value that is stored in the database 30. These values allow the Key Repository process 20 to compute the symmetric encryption key, $E_{symkey}$, and an initialization vector IV, as defined by the well known RSA PKCS #5 methodology. These values are then used to decrypt the secret using the methodology defined by RSA PKCS #1. For Operators, the PKCS #1 methodology will expose the Integrity Key 22. For owners, the PKCS #1 methodology will expose their portion of the Protection Key 24. The RSA key pair alluded to is generated by the Key Repository process 20 at the time that the operator or owner entry is initially defined.

The double encryption password-based public-key encryption technique enables the Key Repository process 20 to change the value of either or both the Integrity Key 22 and the Protection Key 24 once the existing key values are known. Moreover, the changes to the keys can be done without access to operator or owner passwords. In an embodiment of the present invention, this key change occurs in several situations, including:

a) whenever an operator or owner is added or deleted;
b) whenever the definition of the algorithms used in the above process is changed; or
c) whenever the database must be rewritten in order to accommodate an expansion in the size of the database.

Other reasons for changing the key values are institutional regulation (such as government security regulations over banks) and national security issues, which mandate periodic changes in key values.

In addition to the secrets and other information mentioned above, the database 30 also contains policy values and entity credentials that include the enterprise's 31 credentials 32. The database 30 also includes the certificates, private keys and trust root. Trust roots (also known as a trust points) are verification certificates known to be authentic, and which can be used to derive the trustworthiness of other certificates using the methodology defined by the Public Key and Attribute Certificate Frameworks ITU X.509, CCIT: Recommendation X.509, ISO/IEC 9594 which is available from the American National Standards Institute (ANSI) 1819 L. Street, NW, Washington, D.C. 20036. Note, the end entity is normally an organization (such as an institution or enterprise). However, alternate embodiments of the present invention include humans in the list of enterprises 32, such as humans or other groupings or entities that own cryptographic keys to be entrusted in a computer program.

The enterprise end-entity 31, whose secrets the Key Repository process 20 is protecting in the form of enterprise credentials 32, is often an institution or enterprise. These secrets are frequently of significant value, and must not be given to unauthorized application programs. For this reason, the Key Repository process 20 records in the database 30 those applications 40 that are authorized to have access to the enterprise credentials 32.

When an application is initially authorized by the key owners (those with portions of the Protection Key 24), the Key Repository process 20 calculates a checksum (akin to the checksum used with Microsoft's Authenticode) that enables the Key Repository process 20 to detect any future modification in the content of the program binary (executable) file. In the embodiment of the present invention, additional commands are available to the owners that direct the Key Repository process 20 to record in the database 30 authorizations that list the enterprise's 31 name and the name of the application 40 and associated program authentication information for which that enterprise's credentials 32 are authorized. This list is used by the Key Repository process 20 to ensure that the application program 40 is authorized to run and to obtain the enterprise credentials 32 of the specific enterprise 31.

Unlike prior art cryptographic schemes where all of the vital keys, or the passwords to unlock those keys, are kept in memory, and where that memory could be recorded on some storage device (perhaps by operating-system functions such as swapping), in an embodiment of the present invention, the clear version of these vital keys and passwords are retained in protected physical memory. In this way, the security of the system is enhanced by making it impractical to recover the keys from non-volatile storage. However, alternate embodiments of the present invention can keep the keys in virtual memory.

Processing Requests for Enterprise End-Entity Keys

Figure 4:
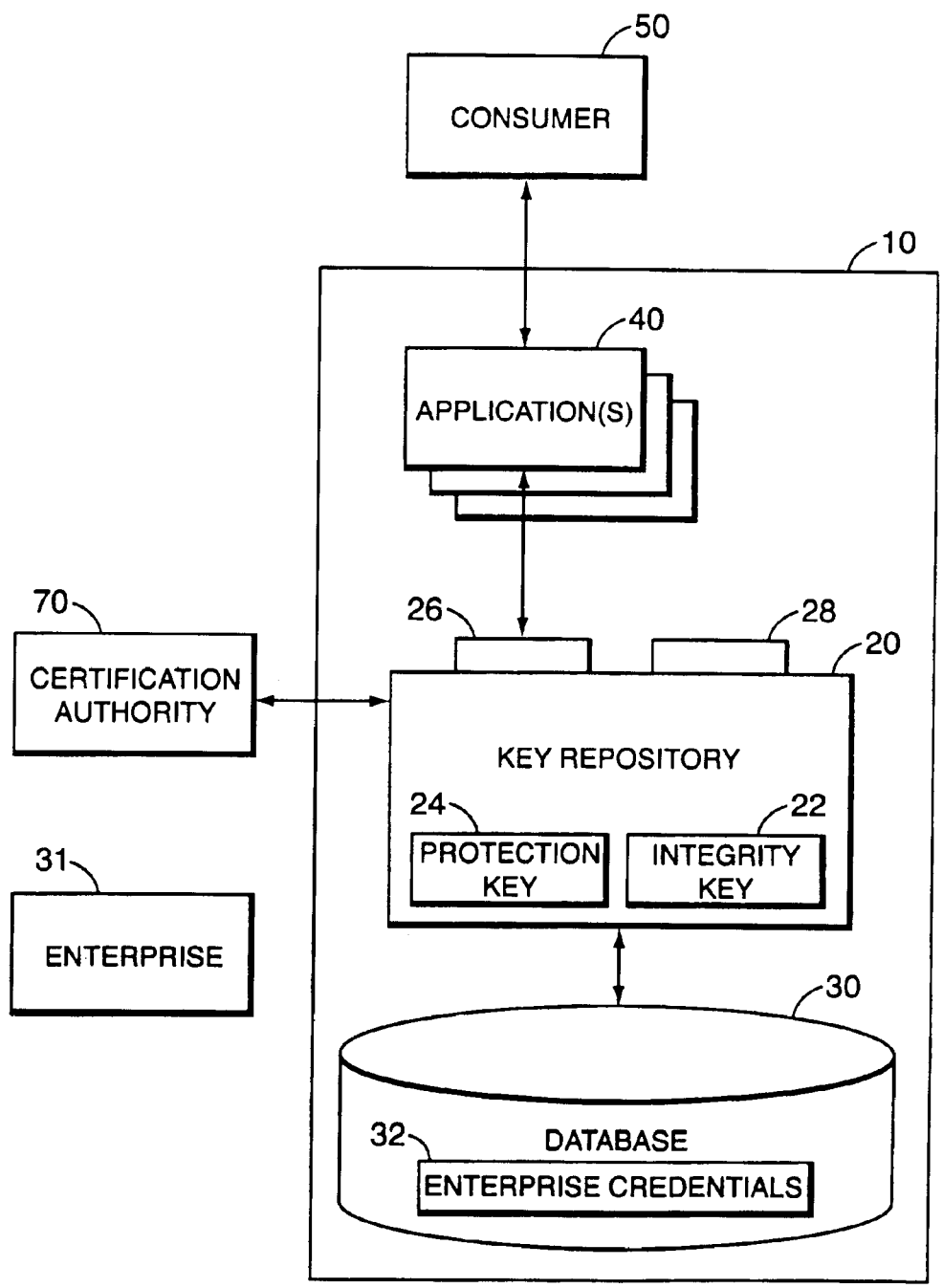
FIG. 4 is a block diagram of an alternate embodiment of the present invention.
Figure 5:
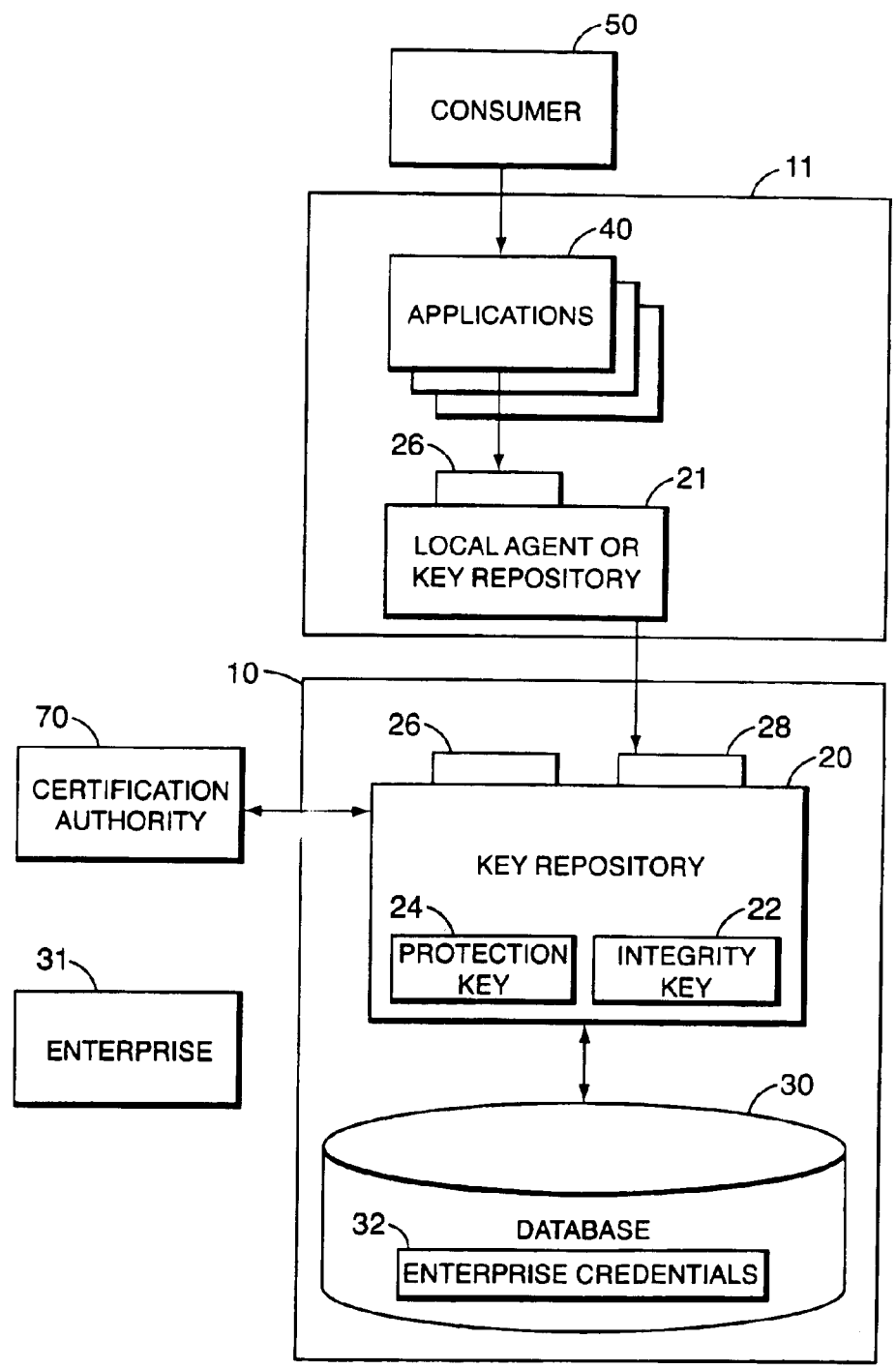
FIG. 5 is a block diagram of an alternate embodiment of the present invention.

Alternate embodiments of the present invention are illustrated in FIGS. 4 and 5. The architecture of the computer system 10 of FIG. 4 is similar to that illustrated in FIG. 1. However, this alternate embodiment adds an extra interface 26 to the Key Repository process 20. The local interface 26 is used by applications 40 to communicate with the Key Repository process 20 where all of the processes reside on the same computer system 10 as illustrated in FIG. 4.

The alternate embodiment that is illustrated in FIG. 5, however, differs from that in FIG. 4 in that some of the applications 40 are instantiated on a second computer system 11. As a result, a different authorization/authentication mechanism is required to process the request for enterprise credentials 32. The applications 40 interact with the local interface 26 on the local agent 21 which can, in yet another alternate embodiment, act as a local Key Repository process. The local agent 21, then, via a secure mechanism (such as SSH, SSL, IP tunneling, etc.) interacts with the Key Repository process 20 via the remote interface 28 as shown in FIG. 5. In this way, the Key Repository process 20 can interact with multiple remote computer systems and thereby extend the scope of capability of the present invention wherein the scalability of the present invention is limited only by the hardware and bandwidth resources.

It should be noted, however, that remote computer systems, such as the computer system 11 of FIG. 5, must have been pre-authenticated and have established a secure connection. Typically, this involves having some human beings (typically Operators) at both ends of the connection to authenticate the machines (i.e., computer systems 10 and 11).

Referring to FIG. 5, a typical business transaction starts with a consumer 50 in the form of, for example, some person making use of a workstation to formulate a request. Included in this request would be the information necessary to authenticate the consumer (such as a username and password and/or a digital certificate), and to transmit that authentication information to the server on the computer system 11. A connection is made to the business application 40, which resides in a server on the computer system 11 that is disjoint from the Key Repository process 20 (that resides on the computer system 10). The application 40, determining that it needs the enterprise credentials (keys) 32 of the enterprise entity 31 that the application 40 is representing, sends such a request to the Key Repository process' 20 local agent 21. From the perspective of the application 40, the use of the local interface 26 on the local agent 21 is identical to the local interface 26 of the Key Repository process 20. Thus the local agent 21 can correctly be characterized as a remote Key Repository process. Thus an application 40 of FIG. 4 would behave identically to an application 40 of FIG. 5. The request from the application 40 is received by the local agent 21. The local agent 21 communicates, using a secure communications medium, with the actual Key Repository process 20, which resides within the computer system 10. In this communication, the local agent 21 includes the identification and authentication information of the application process 40, whereby the Key Repository process 20 will be able to determine with assurance which application is making the request. The communication terminates at the local agent remote agent interface 28 of the Key Repository process 20 as illustrated in FIG. 5.

In both cases illustrated in FIGS. 4 and 5, the Key Repository process 20 now knows with high certainty: 1) the identity of the application program 40 making the request; and 2) the identity of the enterprise 31 whose secrets (enterprise credentials (keys) 32) are being requested.

The decision whether to grant or to refuse the request is made based upon the information stored in the Key Repository process' database 30. In this database 30, the integrity of information is protected by the Integrity Key 22, and confidential information (such as private keys) is protected by the Protection Key 24. Both of these values are known to the Key Repository process 20, and thus the decision can be then rendered based upon authenticated data.

If the decision is made to grant the access, the enterprise credentials 32 are extracted from the database 30, decrypted using the Protection Key 24, re-encrypted, and returned to the requesting application 40 as a response along with a password to decrypt the data. In the example illustrated in FIG. 5, the response will be protected during the transit to the originating system 11 using the secure connection between them.

Operation of the Present Invention

Control of Enterprise Credentials and Authentication of Application Programs

Figure 2:
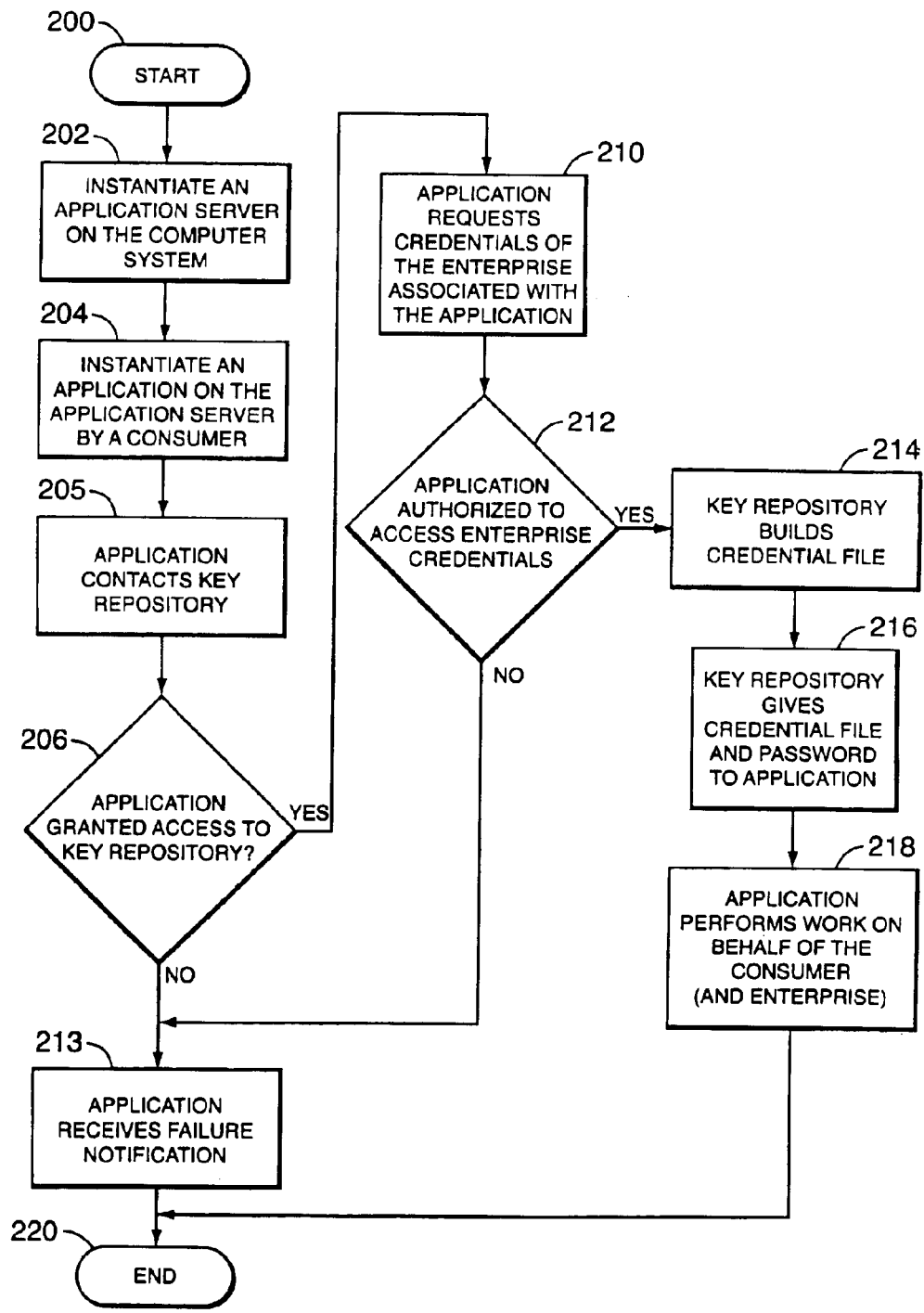
FIG. 2 is a flow chart of the Key Repository process access method of the present invention.

The method of the present invention is illustrated in the flow chart of FIG. 2. This particular method of the present invention presumes that a Key Repository process has been instantiated and that the needed values are already present in the database. Referring to FIG. 2, the process begins at step 200. An application server is instantiated on the computer system (having the Key Repository process and database) in step 202. The application server is a process within the computer system which executes all or part of the desired application. There may be one or more instances of this application server process. This process may have been activated by the arrival of some work item from the outside (not shown), or may have been pre-initiated and be waiting for work.

Next, in step 204, work arrives that is to be performed by the application on behalf of one of the consumers known to the system. The application contacts the Key Repository process in step 206. Next, in step 208, the Key Repository process attempts to authenticate the application, i.e., to determine if the application has been tampered with since it was first registered with the Key Repository process. If the application has not been tampered with (and is one of the applications that is allowed access to the Key Repository process) it is granted access to the Key Repository process, and execution continues to step 210. Otherwise, access to the Key Repository process is denied and execution skips to the end with, optionally, an appropriate error message in step 213 and termination in step 220. If the application has been authenticated, it next requests the enterprise credentials of the enterprise on whose behalf the application is tasked to act, step 210. The Key Repository process then checks, in step 212, whether the requesting application is allowed to have access to the enterprise's credentials. If the Key Repository process determines that access is to be denied, an indication of that result is returned to the requesting application, which, after optionally indicating an error in step 213 and terminates at step 220. If, however, access is to be approved, execution continues to step 214, where the Key Repository process builds a credential file of the end entity for use by the application. Thereafter, in step 216, the Key Repository process transmits (gives) the new credential file, to the application along with a password that enables the application to perform its mission. Thus enabled, the application performs the work on behalf of the consumer (and/or the enterprise) in step 218. In any case, the execution of this method ends in step 220.

Enterprise End-Entity Key Rollover

The Key Repository process is entrusted with the safekeeping of the private keys and trust roots of an enterprise end-entity. The public keys are contained in digital certificates signed by an issuing authority (such as a Certification Authority). There are several situations which can occur that warrant the potential re-issuance of the certificates. These situations include but are not limited to:

a) the approach of the expiration date of the certificate, much as a driver's license is renewed prior to its expiration date;
b) a request by the issuing authority to re-issue the certificate, implying that the certificate owner must periodically check some external database; and
c) a notification from the issuing authority to renew the certificate.

Any of these conditions can cause the Key Repository process, which owns the enterprise end-entity's certificates, to initiate a set of certificate management functions.

In the workstation model, this is usually performed when the user goes through manual logon, and when the individual's keys are currently not in use. In the server model, however, the keys can be in use at any time, and a "logon" event never really happens.

In an embodiment of the current invention, this issue is addressed directly by the Key Repository process. On a time periodic basis, typically once per day but adjustable by the customer, the Key Repository process will check to see if a certificate re-issuance is called for. While this check is going on, and until it is resolved, one way or another, the old keys remain available to applications. During this check, the Key Repository process may utilize the services of a specialized application that acts as an extension of the Key Repository process, but if so, that application has been duly authenticated and authorized to perform such a function.

If the rollover operation results in new or revised keys, the Key Repository process will store these new values in its database. When that storage operation is completed, subsequent requests from applications will receive the new key values. While the applications are still running, however, they can continue to use the older keys. Such requests from application programs can be stimulated by notification, timeout, encountering stale keys, or other events.

Secure Preservation of Intermediate State

In addition to the above activities, the Key Repository process 20 (of FIG. 1) maintains a set of symmetric keys that are supplied specifically to authenticated application programs 40. These symmetric keys allow the application to save intermediate sensitive data to an application-defined database (not shown), or entrust them to insecure cookies (as described below), such that subsequent activities on behalf of the same piece of work can be performed by other application programs 40. This permits the applications 40 to be implemented as a set of context-free programs, using this application-defined database or cookie as a safe place to store contextual information. Furthermore, these symmetric keys are periodically reissued to ensure their freshness and to preclude sufficient time for compromise. In an embodiment of the present invention, the Key Repository process 20 maintains a limited history of old key values so that old data in the application-defined database or cookies will be recoverable. In alternate embodiments of the present invention, the database 30 can act as the application-defined database. However, in an embodiment of the present invention, the application-defined database is separate from the database 30.

Context-free programs normally run on what are called context-free servers. It is within the scope of the present invention that the computer system 10 of the present invention can be a context-free server running context-free programs. An example of a context-free program is a web server because the underlying protocol for web transactions, hypertext transfer protocol (http) and/or the hypertext markup language (HTML), is stateless and thus free of context. Other useful languages include the standard general markup language (SGML), or a derivative therefrom such as the extensible markup language (XML). However, the previously-mentioned protocols and languages are not only ones that can be used with the present invention, any other stateless protocol or language that enables context-free implementation is sufficient for use with the present invention. To provide contextual transactions between computer software processes, the embodiments of the present invention can be configured to retain state (context) information. Namely, in accordance with the present invention, the state (context) information, including confidential information or sensitive information (or data), can be retained across one or more instantiations of application processes using the symmetric keys that are stored and maintained by the Key Repository process. The application in this instance is configured to convey the sensitive context information first by encrypting the sensitive information and then passing the encrypted sensitive information to another instance of the application.

Many transactions involve multiple messages between the submitter and the server. There is often a significant time delay between these messages, especially if the submitter must respond manually, for example, by entering some data at a keyboard. During this delay, however, there is contextual information concerning the transaction that must be saved in order to allow the transaction to continue in an orderly fashion. There are many popular ways to save this information.

One way to save context information is to keep it in the working memory of the server process, and to implement the system such that this same server process instance processes the next incoming message. Unfortunately, this method is expensive, not scalable and not fault-tolerant. The reason this method is expensive is that significant system resources are otherwise unavailable during the waiting period. These significant extra resources must be added to compensate for the processes that are tied up and therefore this method is also not scalable. Moreover, if the process that retains a state fails (or the process in which that process is running fails) the state data is lost and as a result this method is also not fault-tolerant. Accordingly, most modern designs avoid retaining intermediate state in active processes.

A second popular way is to send the contextual information back to the client, and require its re-transmission with the next part of the transaction. Although this method is commonly used by web-based systems using "cookies", it is expensive in terms of communications bandwidth. However, because it does not matter which server instance is invoked, the application is context-free. Unfortunately, if the information includes security information such as secrets, the key that decrypts that data must then be shared among all possible instances of servers which might receive the continuation of the request. The problems associated with the distribution and control of such a key raise the issues addressed in this specification.

A third popular way is to save the contextual information on a database, and to retrieve it when the next part of the transaction takes place. Unlike the well-known cookie method, the database retention method does not increase communications cost, but is still context free.

Server applications written in the second and third methods can be context-free, scalable and fault-tolerant. Within the scope of the present invention, the contextual information will usually include sensitive data (such as cryptographic keys) whose values must be kept private and unmodified. The present invention facilitates the retention of sensitive context by providing authorized application instances with a set of shared symmetric keys, whereby one instance of the server application can use the keys to protect contextual information and another, possibly different application instance, can recover the contextual information because it has access to the same keys. This contextual information can then be transmitted either through the cookie method or in a local database.

Increasing the Security of the Integrity Key

The Integrity Key 22, being accessible by any operator, is more vulnerable than the Protection Key 24, which requires knowledge of multiple passwords. By linking them together, additional protection of the integrity key is achieved.

As noted above, the Integrity Key 22 protects the integrity of the database 30. The Protection Key 24 protects the confidentiality of sensitive data within the database 30. In addition, the Key Repository process 20 stores within the database 30 a cryptographic link between the two keys, thus making it impossible to modify one without the other.

Figure 6:
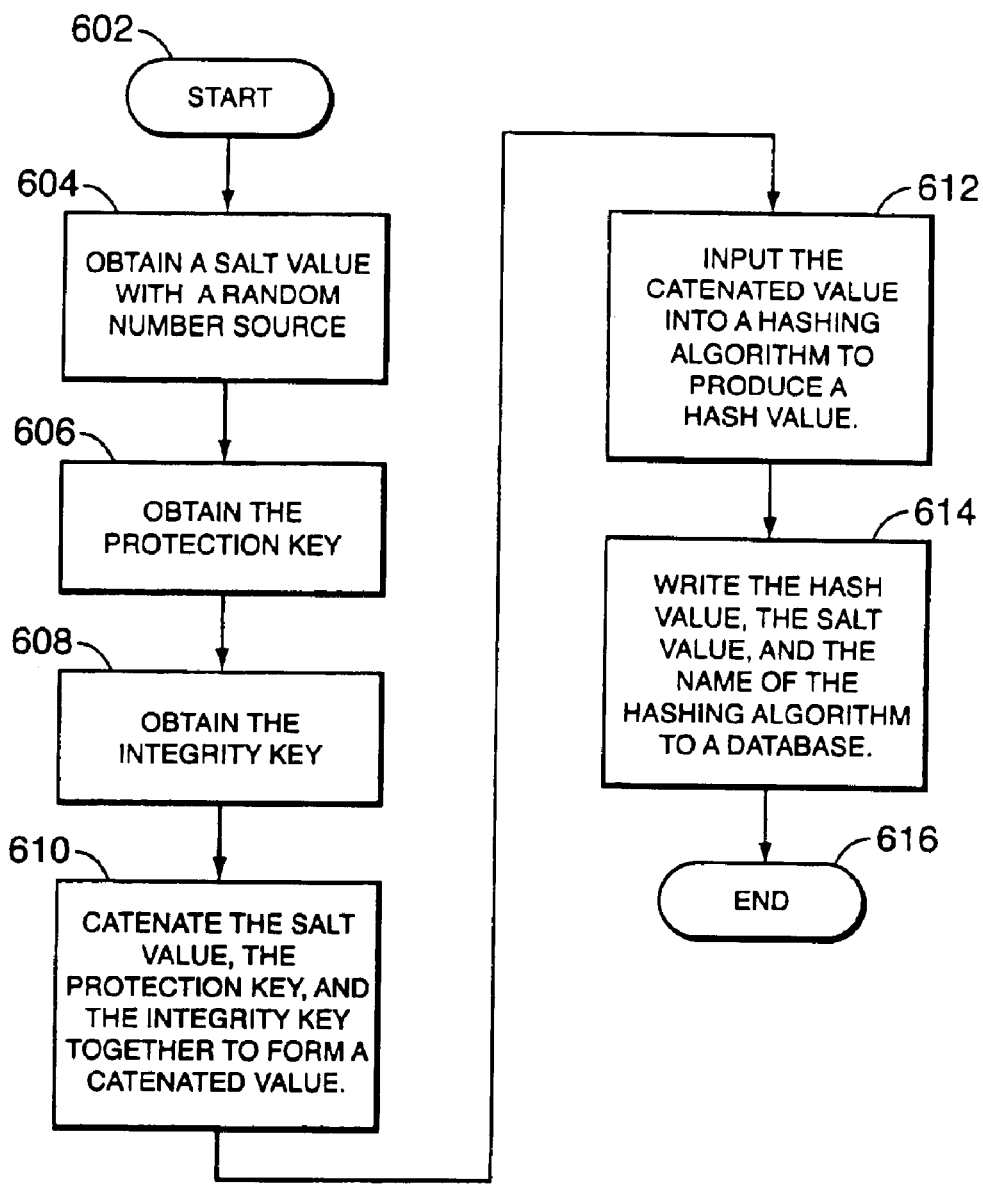
FIG. 6 is a flow chart of the method of establishing a cryptographic link between the master keys of the present invention.

In the present invention, this cryptographic link is constructed as illustrated in FIG. 6 and as described below.

The process begins at step 602. In step 602, a random number source is used to obtain a salt value. Typically, that salt value is 64 bits in length, although salt values of other lengths (longer and shorter) can be used depending upon the desired level of security. In step 606, the Protection Key is obtained. Similarly, in step 608, the Integrity key is obtained. The Integrity Key and the Protection key each consist of the name of the symmetric encryption algorithm, an initialization vector and a key value. In step 610, the Protection Key value, the Salt value, and the Integrity Key value are concatenated together. The concatenated value is then used as input to the hashing algorithm in step 612 to produce a Hash value (i.e. Hash (<Protection-key>|<Salt>|<Integrity Key>) produces the Hash value). The Hash value, the Salt value, and the name of the hashing algorithm are then written to the database in step 614 and the process ends in step 616.

The Integrity Key 22 is revealed by having any operator provide a name and a correct password. Thus, any malicious and sufficiently skilled operator could obtain a copy of the database, use the password to reveal the Integrity Key 22, modify the database 30, and rewrite it. However, since the Protection Key is still safe, none of the private information can be modified without detection, and this includes the shares of the protection key in owner entries. When this corrupted database is returned to the running system and any operator (not necessarily the malicious one) activates the system, the integrity checks in the database will succeed, and the Key Repository process 20 will be unable to differentiate this corrupt database from a legitimate one.

Unfortunately for the malicious operator, he did not modify the Protection Key 24. The Key Repository process 20 will detect that the database 30 is invalid (corrupt) at a later time when the owners identify themselves and the original Protection Key 24 is recovered, and the actual key does not produce a valid answer, or the cryptographic link between the keys is tested.

Safeguarding Policy Values

One ramification of the arrangement and the application of the present invention is that a change to a policy (numbers, values, etc.) requires the approval of those members of the enterprise that build the master keys. In this way, single individuals cannot grant themselves unauthorized access to the computer system 10.

Thus, the present invention contains centralized repository processes for keys, policy, policy decisions, authentication of application programs 40, and authorizations to use enterprise credentials 32. An important security feature of the present invention is the status of Key Repository process 20 as a process. The Key Repository process 20 has a data storage function, in that it stores the Integrity Key 22 and the Protection Key 24 in the working memory of the Key Repository process 20. To protect the security of the master keys within the Key Repository process 20, special functionality on the computer system 10 is utilized to prevent the contents of the Key Repository process from being copied to a swap file or page file. If this lock memory functionality is not used, the Integrity Key 22 and/or the Protection Key 24 could be copied onto the swap file and be compromised. An embodiment of the present invention keeps the Key Repository process 20 in non-swappable protected physical memory.

Gateways

Alternate embodiments of the present invention are provided with a gateway 60. The gateway 60 provides a separate process that mimics the workstation paradigm for communication with the certification authority 70 per the certification authority's protocol. This enables the system of the present invention to make use of existing libraries that implement the workstation models (paradigms) to communicate with their respective certification authority (in search of the certification authority certificate), without requiring the modification of that library to make it work with the Key Repository process, since those libraries will have access to the enterprise credentials 32. As a result, gateway programs are authorized to the Key Repository process 20 using methods similar to that used to authenticate and authorize application programs 40.

Summary of Normal Operation Flows

To restate the normal operation of the present invention in terms of the block diagram of FIG. 1, an application program 40 attempts to perform some activity on behalf of an enterprise end-entity 31, and requiring the enterprise credentials 32 on the computer system 10. The application 40 asks the Key Repository process 30 if the application 40 is allowed to access the enterprise credentials 32 (that are stored within the database 30). In this sense, the Key Repository process 20 is both a repository and an authenticator. It should be noted that the apparatus and method of the present invention can utilize symmetric as well as the more complex asymmetric key methodologies.

In an embodiment of the present invention, the application 40 asks the Key Repository process 20 for access to an encrypted copy of the enterprise credentials 32. The Key Repository process 20 either provides the password or refuses to provide the password based upon the authorization setup for the enterprise 31 and the application 40. A predefined policy will decide whether or not the Key Repository process 20 provides the password. As mentioned before, the policy framework is stored within the database 30. The enterprise credentials 32, containing the certificates and trust roots of the enterprise 31, are protected by the Integrity Key 22 and the Protection Key 24.

The Integrity Key 22 also protects the policy value that defines the number of Owners needed to change policy values. It also protects the Owner entries needed to re-compute the Protection Key 24, and would detect any tampering with those values.

Parameters and Methods

The following is a detailed illustrative discussion of parameters and methods that can be used to implement an embodiment of the present invention. However, it will be recognized by those skilled in the art that considerable modification of this example is possible without departing from the spirit and scope of the present invention.

The Keys

All cryptographic systems are based on the concept of keys. For software cryptographic schemes, the longer the key (i.e., the more bits that comprise the key), the more secure the system. Sophisticated cryptography systems utilize multiple keys in schemes that require multiple individuals to be involved with the invocation of system. Multiple keys preclude the compromise of the system by a single individual, thereby increasing the security of the information contained within the system.

The following keying material is used:

The Integrity Key

The Integrity Key 22 is a strong symmetric encryption key used to provide integrity for most of the database 30. The method used is a Symmetric Message Authentication Code (MAC) as described by Schneier, and uses any of the symmetric encryption algorithms supported by the Key Repository process 20. The key is generated by the Key Repository process 20 when the database is created, and is regenerated whenever the database is rewritten. The new value of the key is stored in each operator entry, encrypted with that operator's public key, and then saved in the database.

Whenever an operator logs on as part of the initial activation of the Key Repository process 20, the operator's password and salt are used to decrypt the private key, which in turn is used to decrypt the Integrity Key 22, which enables the computer program to ascertain that the database has not been tampered with. If the database is already open, this logon provides the Key Repository process 20 with the ability to update the operator's public/private key pair in case one of the parameters which control this operation has changed.

As each subsystem operator is established and the manual password entered, the Key Repository process 20 generates the salt and RSA keys as described above, and the Integrity Key 22 is encrypted with the RSA private key. The reverse step of logging on is as follows:
a) Use the manually entered subsystem operator's name to find the entry in the database;
b) Use the password just entered, the Salt value, the hash iteration count, and the algorithm specifications recorded in the database, compute the passkey, which consists of a symmetric key and initialization vector; then, erase the password;
c) Using the passkey, decrypt the saved private key; then erase the passkey;
d) Verify that the value just decrypted ends with 8 zero bytes, and then discard those bytes;
e) Use the private key value to decrypt the Integrity Key 22, and then erase the private key;
f) If the system is not yet in the starting state, this is the Integrity Key 22 value, otherwise, the value just revealed ought to be the same as the current value of the Integrity Key 22; and
g) Discard the subsystem operator's password, passkey, retaining only the Integrity Key 22.

The Protection Key

The Protection Key 24 is a strong symmetric encryption key used to provide secrecy for sensitive data in the database 30. It is never kept on the database 30 but instead is reconstructed by combining information from the requisite number of Protection Key 24 Owners. This key can be changed upon request.

As each owner is introduced to the Key Repository process 20, the Owner's name and password are used to generate the salt and RSA keys as described above.

At a later time, either at database 30 creation, or when the addition of this owner has been approved, a valid Protection Key 24 value will be available. At this point, the Protection Key 24 value is split into N pieces such that any M of them can be used to reconstruct the value, where N is greater than M, and M is greater than one. The methodology is the Bloom-Shamir Secret Splitting algorithm. According to the algorithm, the secret is divided among a plurality of people. As each owner's secret portion is generated, it is encrypted with that owner's public key and stored in the database 30. Later, when it's time to reconstruct the secret, the needed number of owner's names and passwords are obtained, and:
a) Use the manually entered owner's name to find the entry in the database;
b) Use the Integrity Key 22 to verify that the database is okay;
c) Use the password, the salt value, and the algorithm description to perform a Password Decryption to recover the portion of the shared secret; and
d) When enough portions have been exposed, use the Bloom-Shamir Secret Splitting algorithm is used to recreate the Protection Key 24.

The Trust

There are some assumptions about the kind of attacks from which we have no protection:
a) An attacker does not have the protection key 24, nor the passwords to retrieve all of them from the database (note that if the attacker has all but one of the required owner's passwords, the last one still protects the protection key);
b) The attacker will not use supervisory privileges (e.g., root authority) to rummage through the memory image of the Key Repository process 20 and find the keys; and
c) The attacker will not be able to retrieve the keys from the swap image on the disks.

Note, the Operator entry allowed the program to determine that the database 30 had integrity. However, a malicious operator could have generated his own Integrity Key 22, and pass-phrase, and thus could have substituted the files.

The multiple application owner entries allowed the program to decrypt the data. However, this malicious operator could have inserted his own entries as application owners, and created his own master key.

When the Protection Key 24 is finally exposed, the Certification Authority's 70 signing key is decrypted and verified. Remember it must be self-signed. However, this malicious operator could have used his own Certification Authority to generate all the keys.

In fact, there is no way the system can differentiate between the "real" database, and a totally fake database that is fully populated. The ultimate protection relies upon dual authentication from the original client program (such as the user at the web browser) and the internal environment, relying upon trusted copies of trust roots. This situation is identical to that encountered when two principals wish to authenticate each other; both must have independently-authenticated copies of a Root Certificates (or some intermediate trust point) as the root of the trust relationship. However, should any of the normal operators or owners attempt to interact with this fake system, they would immediately detect failures, exhibiting themselves as password failures.

Since the database is protected with both the integrity and privacy checks, no security breach will occur if the database is exposed. However, if the attacker has the passwords of enough owners, all security is moot. It is the responsibility of the customer's practices and procedures to guard against this situation. Prudence therefore dictates that both the passwords and the database should be guarded, making it harder for an attacker to succeed.

Server Application Programs

Once the Key Repository process 20 has been initiated, and programs authorized to access it, the customer will initiate execution of these programs when needed. The programs will communicate with the Key Repository process 20 to obtain the secrets.

This communication is encapsulated inside libraries that are provided with the present invention, and use a protocol that has the functionality such that the name and content of the program file of the sender can be determined in a trusted manner using operating-system primitives. This precludes the conveyance of this protocol over an open insecure transport medium. The libraries communicate with the Key Repository process 20 using such a protocol. As a result, the Key Repository process 20 can authenticate the application program 40.

It is envisioned that application authentication will be performed when the application first performs credential acquisition (logon), or to restore context, but once done, need not be done again within the instance of this server.

To direct this operation, the libraries must be provided with the name of the Key Repository process 20 in a notation appropriate to the host operating system. If the application is performing a logon function, the name of the enterprise on behalf of whom the application is acting, is also available. The entity name used here is the same name used in the Key Repository process 20 to identify the enterprise credentials 32. How this value is known to the application is application-specific. However, UNIX-like environment variables or command-line parameters are suitable ways to pass the name of the Key Repository process 20, a method which would enhance portability.

The Key Repository process 20, upon sensing the incoming request, and using functions available from the operating system (such as the name under which it was addressed) understands that the request is originating from an application program 40 and is about to use the agreed-upon protocol to request and to obtain the user's credentials. If the Key Repository process 20 cannot identify the requesting program as being one of the authenticated applications, the incoming request is rejected with a security violation error, and the attempt is logged as a potential security breach. If the application program is successfully authenticated, the Key Repository process 20 ascertains whether this application 40 is authorized to work with the requested credentials. If this test fails, the Key Repository process 20 responds to the requesting application program 40 with an error that is conveyed back to the user's application as a password failure, emulating a logon failure. However, if the test succeeds, the Key Repository process 20 builds a file containing the needed credentials (or uses one already built), encrypts the confidential data with an invented password. This password and the location of the file are returned back to the libraries inside or associated with the application program 40 which completes the acquisition of the credentials by decrypting the credential file. The application program 40 is then informed of a successful logon, and work can commence.

The present invention, therefore, is well adapted to carry out the objects and attain both the ends and the advantages mentioned, as well as other benefits inherent therein. While the present invention has been depicted, described, and is defined by reference to particular embodiments of the invention, such references do not imply a limitation to the invention, and no such limitation is to be inferred. The invention is capable of considerable modification, alternation, alteration, and equivalents in form and/or functions, as will occur to those of ordinary skill in the pertinent arts. The depicted and described embodiments of the invention are exemplary only, and are not exhaustive of the scope of the present invention. Consequently, the present invention is intended to be limited only by the spirit and scope of the appended claims, giving full cognizance to equivalents in all respect.

What is claimed is:

1. A cryptographic system, comprising:
at least one server;
any number of clients;
at least one application located on one of the at least one server, each capable of engaging in a context-free multi-part communication session with any of the clients;
a key repository process on one of the at least one server, the key repository process configured to validate and record authorizations of specific programs to access one or more than one set of symmetric keys, wherein each of the at least one application is configured to query the key repository process for one or more than one set of symmetric keys, and the key repository process further configured, in response to the query from a particular instance of the at least one application, to provide the requested one or more than one set of symmetric keys to the particular instance of the at least one application but only if the key repository process authenticates the particular instance of the at least one application as being pre-authorized to receive the requested one or more than one set of symmetric keys;
the particular instance of the at least one application can utilize the one or more than one set of symmetric keys for securely off-loading sensitive information in any intermediate part of the context-free multi-part communication session; and
the key repository process includes a database for storing the one or more than one set of symmetric keys, each set of symmetric keys including an integrity key for ensuring the integrity of information stored in the database and a protection key configured to protect sensitive information on the database, the database storing there within operator entries used to retain the value of the integrity key and owner entries used to retain a share of the protection key.

2. The cryptographic system as in claim 1, wherein the sensitive information in an intermediate part is securely off-loaded to the database.

3. The cryptographic system as in claim 1, wherein the sensitive information in an intermediate part is securely off-loaded as a cookie to an intended one of the clients that returns the cookie within a next part of the context-free multi-part communication session.

4. The cryptographic system as in claim 1, wherein the key repository process maintains one set of symmetric keys for all of the at least one application.

5. The cryptographic system as in claim 1, wherein the key repository process maintains a distinct set of symmetric keys for each one of the at least one application.

6. The cryptographic system as in claim 1, wherein the text-free multi-part communication session is conducted using a hypertext transfer protocol.

7. The cryptographic system as in claim 1, wherein both the at least one application and the at least one server utilize one of a hypertext markup language, a standard generalized markup language, and an extensible markup language.

8. The cryptographic system as in claim 1, wherein the securely off-loaded sensitive information can be then accessed by any one of the at least one application engaging in the context-free multi-part communication session.

9. The cryptographic system as in claim 1, wherein the securely off-loaded sensitive information is encrypted.

10. The cryptographic system as in claim 1, wherein the sensitive data is securely off-loaded to a working memory in a server to enable a single server process instance to service all communications between the at least one application and the server.

11. The cryptographic system as in claim 1, wherein the at least one application includes instances of the same application.

12. The cryptographic system as in claim 1, wherein the key repository process is a process pair.

13. A method for secure context-free multi-part communication in a computer system with a server and any number of clients, including none, the method comprising:
instantiating at least one application on the server, each capable of engaging in a context-free multi-part communication session with any of the clients:
instantiating a key repository process on the server, so that the key repository process validates and records authorizations of specific applications to access one or more than one set of symmetric keys, wherein each of the at least one application is configured to query the key repository process for one or more than one set of symmetric keys, and
in response to the query from a particular instance of the at least one application, the key repository process provides the requested one or more than one set of symmetric keys to the particular instance of the at least one application but only if the key repository process authenticates the particular instance of the at least one application as being pre-authorized to obtain the requested one or more than one set of symmetric keys;

wherein, the particular instance of the at least one application utilizes the one or more than one set of symmetric keys for securely off-loading sensitive information in any intermediate part of the context-free multi-part communication session and the key repository process includes a database for storing the one or more than one set of symmetric keys, each set of symmetric keys including an integrity key for ensuring the integrity of information stored in the database and a protection key configured to protect sensitive information on the database, the database storing there within operator entries used to retain the value of the integrity key and owner entries used to retain the value of the integrity key and owner entries used to retain a share of the protection key.

14. A server, comprising:

a key repository, the key repository configured to validate and record authorizations of specific programs to access one or more than one set of symmetric keys, wherein an application is configured to query the key repository for one or more than one set of symmetric keys, and the key repository responsive to the query from the application, provides the requested one or more than one set of symmetric keys to the application but only if the key repository authenticates the application as being pre-authorized to receive the requested one or more than one set of symmetric keys, the application can utilize the one or more than one set of symmetric keys for securely off-loading sensitive information; and a database for storing the one or more than one set of symmetric keys, each set of symmetric keys including an integrity key for ensuring the integrity of information stored in the database and a protection key configured to protect sensitive information on the database, the database storing there within operator entries used to retain the value of the integrity key and owner entries used to retain a share of the protection key.

15. A server as defined in claim 14, wherein the server utilizes one of a hypertext markup language, a standard generalized markup language, and an extensible markup language.

16. A server as defined in claim 14, wherein the sensitive information in an intermediate part is securely off-loaded as a cookie.

17. A server as defined in claim 14, wherein the securely off-loaded sensitive information is encrypted.

18. A method for establishing a secure communication session by a client, the method comprising:

establishing a context-free multi-part communication session with a server; and causing in response to a query by the client of an application, a key repository process to be configured to validate and record authorizations of specific programs to access one or more than one set of symmetric keys, wherein the application is configured to query the key repository process for one or more than one set of symmetric keys, and the key repository process is further configured, in response to the query from the application, to provide the requested one or more than one set of symmetric keys to the application but only if the key repository process authenticates the particular application as being pre-authorized to receive the requested one or more than one set of symmetric keys; the key repository process including a database for storing the one or more than one set of symmetric keys, each set of symmetric keys including an integrity key for ensuring the integrity of information stored in the database and a protection key configured to protect sensitive information on the database, the database storing there within operator entries used to retain the value of the integrity key and owner entries used to retain a share of the protection key.

* * * * *

UNITED STATES PATENT AND TRADEMARK OFFICE
CERTIFICATE OF CORRECTION

PATENT NO. : 6,901,512 B2　　　　　　　　　　　　　　　　　　　　　　　Page 1 of 1
APPLICATION NO. : 09/736715
DATED : May 31, 2005
INVENTOR(S) : David Michael Kurn et al.

It is certified that error appears in the above-identified patent and that said Letters Patent is hereby corrected as shown below:

IN THE CLAIMS

Claim 13, Column 22, line 58, after "clients" delete ":" and insert therefor --;--

Claim 13, Column 23, line 20, after "owner entries" delete "used to retain the value of the integrity key and owner entries"

Signed and Sealed this

Twenty-third Day of June, 2009

JOHN DOLL
*Acting Director of the United States Patent and Trademark Office*